(12) United States Patent
Kagotani et al.

(10) Patent No.: US 11,373,344 B2
(45) Date of Patent: Jun. 28, 2022

(54) OPTICAL FILM

(71) Applicant: TOPPAN PRINTING CO., LTD., Tokyo (JP)

(72) Inventors: Akihito Kagotani, Tokyo (JP); Toshiki Toda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 366 days.

(21) Appl. No.: 16/422,382

(22) Filed: May 24, 2019

(65) Prior Publication Data

US 2019/0279403 A1   Sep. 12, 2019

Related U.S. Application Data

(63) Continuation of application No. PCT/JP2017/042638, filed on Nov. 28, 2017.

(30) Foreign Application Priority Data

Nov. 28, 2016  (JP) .............................. JP2016-230369

(51) Int. Cl.
| | | |
|---|---|---|
| *G06T 11/00* | (2006.01) | |
| *G02B 5/32* | (2006.01) | |
| *B42D 25/328* | (2014.01) | |
| *G03H 1/08* | (2006.01) | |

(Continued)

(52) U.S. Cl.
CPC .......... *G06T 11/003* (2013.01); *B42D 25/328* (2014.10); *G02B 5/32* (2013.01); *G03H 1/02* (2013.01); *G03H 1/08* (2013.01); *G09G 3/2003* (2013.01)

(58) Field of Classification Search
None
See application file for complete search history.

(56) References Cited

U.S. PATENT DOCUMENTS

| | | | | |
|---|---|---|---|---|
| 2004/0258274 | A1* | 12/2004 | Brundage | ............. G07D 7/128 |
| | | | | 382/100 |
| 2008/0057407 | A1* | 3/2008 | Kitamura | ............. G03H 1/0808 |
| | | | | 430/2 |
| 2016/0148400 | A1* | 5/2016 | Bajic | ......................... G06T 9/00 |
| | | | | 382/304 |

FOREIGN PATENT DOCUMENTS

| | | |
|---|---|---|
| JP | H11-202741 A | 7/1999 |
| JP | 2001-109362 A | 4/2001 |
| JP | 2003-177655 A | 6/2003 |

(Continued)

OTHER PUBLICATIONS

International Searching Authority, "International Search Report," issued in connection with International Patent Application No. PCT/JP2017/042638, dated Feb. 6, 2018.

(Continued)

*Primary Examiner* — Aaron M Richer
(74) *Attorney, Agent, or Firm* — Foley & Lardner LLP

(57) ABSTRACT

An optical film including a recording surface on which a plurality of unit blocks is disposed at regular intervals. For these unit blocks, phase components of light from a reconstruction point are calculated. The recording surface includes a calculated element region provided with an array of the unit blocks for which phase components of light from the reconstruction point are calculated for reproduction of an image. A first image is a monotone reconstruction image having even brightness, and a second image is a grayscale image having brightness gradation.

19 Claims, 18 Drawing Sheets

(51) Int. Cl.
*G03H 1/02* (2006.01)
*G09G 3/20* (2006.01)

(56) References Cited

FOREIGN PATENT DOCUMENTS

| JP | 3810934 A | 8/2006 |
|---|---|---|
| JP | 2008-083658 A | 4/2008 |
| JP | 4256372 B2 | 4/2009 |

OTHER PUBLICATIONS

International Searching Authority, "Written Opinion," issued in connection with International Patent Application No. PCT/JP2017/042638, dated Feb. 6, 2018.
Extended European Search Report dated Oct. 23, 2019 for corresponding Application No. 17873680.7 (10 pages).
Ichikawa Tsubasa et al.: "Full parallax computer generated hologram using GPU-accelerated ray tracing method", Practical Holography XXVI: Materials and Aopplications, SPIE, vol. 8281, No. 1, Feb. 9, 2012 (Feb. 9, 2012), pp. 1-8, XP060001781 (8 pages).

* cited by examiner

FIG. 12A

UNDER ENVIRONMENT OF 1,500 lx WELL-LIT

| SAMPLE NO. | | No.1 | No.2 | No.3 | No.4 | No.5 | No.6 | No.7 | No.8 | No.9 |
|---|---|---|---|---|---|---|---|---|---|---|
| AREA OF CELL REGION | S | 0.0001 | 0.000399 | 0.0001 | 0.000399 | 0.000108 | 0.000108 | 0.000108 | 0.000108 | 0.000108 |
| NUMBER OF IMAGE-REPRODUCING POINTS | N | 96 | 579 | 1400 | 5520 | 12433 | 12433 | 12433 | 12433 | 12433 |
| VIEWING ANGLE | $\theta$ | 10.89 | 10.9 | 10.89 | 10.9 | 20 | 30 | 40 | 50 | 60 |
| LUMINOUS INTENSITY | I | 0.009055 | 0.003126 | 0.000681 | 0.000469 | 3.42E-05 | 1.54695E-05 | 8.86E-06 | 5.81E-06 | 4.15E-06 |
| ASSESSMENT OF BRIGHTNESS | | VERY GOOD | VERY GOOD | VERY GOOD | VERY GOOD | VERY GOOD | GOOD | FAIR | POOR | POOR |

FIG. 12B

UNDER ENVIRONMENT OF 100 lx DARK

| SAMPLE NO. | | No.1 | No.2 | No.3 | No.4 | No.5 | No.6 | No.7 | No.8 | No.9 |
|---|---|---|---|---|---|---|---|---|---|---|
| AREA OF CELL REGION | S | 0.0001 | 0.000399 | 0.0001 | 0.000399 | 0.000108 | 0.000108 | 0.000108 | 0.000108 | 0.000108 |
| NUMBER OF IMAGE-REPRODUCING POINTS | N | 96 | 579 | 1400 | 5520 | 12433 | 12433 | 12433 | 12433 | 12433 |
| VIEWING ANGLE | θ | 10.89 | 10.9 | 10.89 | 10.9 | 20 | 30 | 40 | 50 | 60 |
| LUMINOUS INTENSITY | I | 0.000604 | 0.000208 | 4.54E-05 | 3.13E-05 | 2.28E-06 | 1.0313E-06 | 5.91E-07 | 3.87E-07 | 2.77E-07 |
| ASSESSMENT OF BRIGHTNESS | | VERY GOOD | VERY GOOD | VERY GOOD | GOOD | POOR | POOR | POOR | POOR | POOR |

OPTICAL FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/042638, filed on Nov. 28, 2017, which is based upon and claims the benefit of priority to Japanese Patent Application No. 2016-230369, filed on Nov. 28, 2016; the disclosures of which are all incorporated herein by reference in their entireties.

TECHNICAL FIELD

The present disclosure relates to an optical film in which phase components of spatial information calculated by a computer are recorded to reproduce an image or the like.

BACKGROUND ART

Optical films in recent years are controlled based on interference of light which is calculated by a computer. For such optical films, the following patent literatures describe a composite image reproduced by a computer.

These patent literatures describe a composite image by way of examples of usage in securities, card media, and personal authentication media. For example, patent literature JP 4256372 B discloses a technique of calculating interference effects of light by using a computer.

Interference fringe information corresponds to information on amplitude of light. In the case where amplitude of light is recorded on an optical film, there is a concern that the intensity of light is reduced when reproduced, although it depends on the method of recording the amplitude. Patent literatures JP 4256372 B2 and JP 3810934 B2 each disclose reproducing light interference infringes by calculating intensities of interference waves of reference light and object light.

SUMMARY OF THE INVENTION

However, these calculation methods are predicated on reference light. Accordingly, if the object light is to be reproduced, the information on the reference light defined at the time of calculation is needed. Specifically, an image can be reproduced with the same conditions as those at the time of recording, only when the optical film is illuminated under the same conditions as those of the reference light information at the time of recording. Thus, there is an issue that an image can be reproduced only under conditions limited to those of the reference light at the time of recording.

The number of reconstruction points is an important parameter for reproducing a composite image by using a computer. When increasing the quality of a design pattern, the number of reconstruction points is increased and an image of a high-definition design pattern is reproduced. However, increase in the number of reconstruction points entails decrease accordingly in the brightness of the reproduced image. It is true that decrease in the number of reconstruction points can accordingly increase the brightness of the reconstruction points; however, information as a design pattern will become insufficient. Therefore, it is necessary to determine the number of reconstruction points with which a high-definition design pattern can be reproduced, while maintaining the brightness required for the observer.

The present disclosure has been made in light of a background set forth above, and aims to optimize the number of reconstruction points for an optical film in which phase components of spatial information calculated by a computer are recorded, so that an image is reproduced without using the conditions of the reference light at the time of recording.

To achieve the above aim, the present disclosure provides the following means.

According to an optical film of an embodiment of the invention, the optical film includes a recording surface on which a plurality of unit blocks is disposed at regular intervals. In the optical film, the recording surface includes a first calculated element region provided with an array of unit blocks for which phase components of light from a reconstruction point configuring a first image are calculated, and a second calculated element region provided with an array of unit blocks for which phase components of light from a reconstruction point configuring a second image are calculated. In the optical film, the first image is a monotone reconstruction image having even brightness, and the second image is a grayscale image having brightness gradation.

According to an optical film of an embodiment of the invention, the number of reconstruction points reproducing the first image is different from the density of reconstruction points reproducing the second image.

According to an optical film of an embodiment of the invention, the recording surface is defined on an x-y plane, and the reconstruction points are arrayed at an even pitch in both an x direction and a y direction, and establish the following relationship.

[Math. 1]

$$N \leq \frac{E \cdot S \cdot \delta}{2\pi I_{th}(1 - \cos\theta)}$$

In the relationship, N is the number of reconstruction points, E is an illuminance in the environment where the image is reproduced, S is an area of the calculated element region, δ is a diffraction efficiency on the recording surface, $I_{th}$ is a threshold of luminous intensity desired for the image, and θ is a viewing angle for defining the calculated element region. Each phase component of a grayscale image reproduced at a grayscale reconstruction point is calculated according to the following relationship.

[Math. 2]

$$W(kx, ky) = \sum_{n=0}^{Nmax} \sum_{kx=Ymin}^{Ymax} \sum_{kx=Xmin}^{Xmax} amp \cdot \exp(i\phi)$$

$$\phi = \frac{\pi}{\lambda \cdot O_n(z)}\{(O_n(x) - kx)^2 + (O_n(y) - ky)^2\}$$

In the relationship, W(x, y) is a phase component at a coordinate x or y, i is an imaginary number, λ is a wavelength of light at the time of reproducing the image, $O_n$(x, y, z) is a central coordinate of a unit block nearest to a coordinate of a reconstruction point, (kx, ky, O) is a coordinate of a unit block, φ is a phase angle, and amp is grayscale information.

According to an optical film of an embodiment of the invention, each phase component of a monotone reconstruction image reproduced at a monotone reconstruction point is calculated according to the following relationship.

[Math. 3]

$$W(x, y) = \sum_{n=0}^{Nmax} \sum_{kx=Ymin}^{Ymax} \sum_{kx=Xmin}^{Xmax} \exp(i\phi)$$

$$\phi = \frac{\pi}{\lambda \cdot O_n(z)} \{(O_n(x) - kx)^2 + (O_n(y) - ky)^2\}$$

In the relationship, W(x, y) is a phase component at a coordinate x or y, i is an imaginary number, λ is a wavelength of light at the time of reproducing the image, $O_n(x, y, z)$ is a central coordinate of a unit block nearest to a coordinate of a reconstruction point, (kx, ky, O) is a coordinate of a unit block, and φ is a phase angle.

According to an optical film of an embodiment of the invention, personal authentication information is recorded.

According to an embodiment of the invention, resolution of the reconstruction points can be improved or even maximized when the reproduced image is observed from the front, and the N reconstruction points can be determined in terms of the viewing angle θ and the area S of each calculated element region to ensure brightness required for observation. The grayscale image reproduced at a graysca n=0 ky=Y min kx=X min a picture, such as a portrait or a landmark. The monotone reconstruction image reproduced at a monotone reconstruction point can show readable information, such as a trademark, a logo, a symbol or a company name. Thus, the reproduced image can simultaneously express artistic value and identification information. These grayscale image and monotone reconstruction image can be presented with improved or even optimum brightness.

According to the optical film of an embodiment of the invention, a plurality of images can be reproduced. In particular, a monotone reconstruction image and grayscale image can be reproduced.

According to the optical film of an embodiment of the invention, phase components of a grayscale image can be calculated.

According to the optical film of an embodiment of the invention, phase components of a monotone reconstruction image can be calculated.

According to the optical film of an embodiment of the invention, personal authentication information can be recorded.

BRIEF DESCRIPTION OF THE DRAWINGS

FIG. 12A is a diagram listing conditions of samples and assessments thereof (well-lit observation conditions).

FIG. 12B is a diagram listing conditions of samples and assessments thereof (dark observation conditions).

DESCRIPTION OF REPRESENTATIVE EMBODIMENTS

Figure 1A:
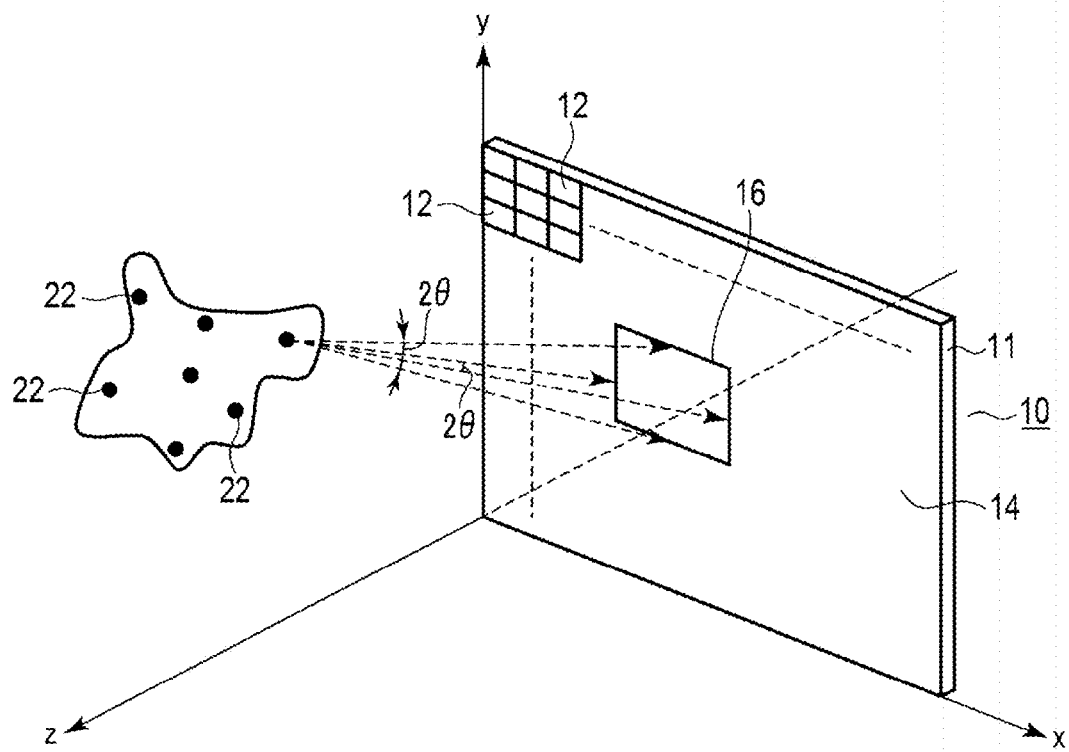
FIG. 1A is a schematic diagram illustrating an optical film, according to an embodiment of the present disclosure.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

Embodiment

FIG. 1A is a schematic diagram illustrating an optical film, according to an embodiment of the present invention.

Specifically, FIG. 1A shows an optical film 10 according to the embodiment including a substrate 11 with a recording surface 14. The recording surface 14 corresponds to the front surface of the substrate 11 and is provided with a plurality of unit blocks 12 disposed at regular intervals. The recording surface 14 is defined in an x-y plane, and includes a calculated element region 16.

Figure 2:
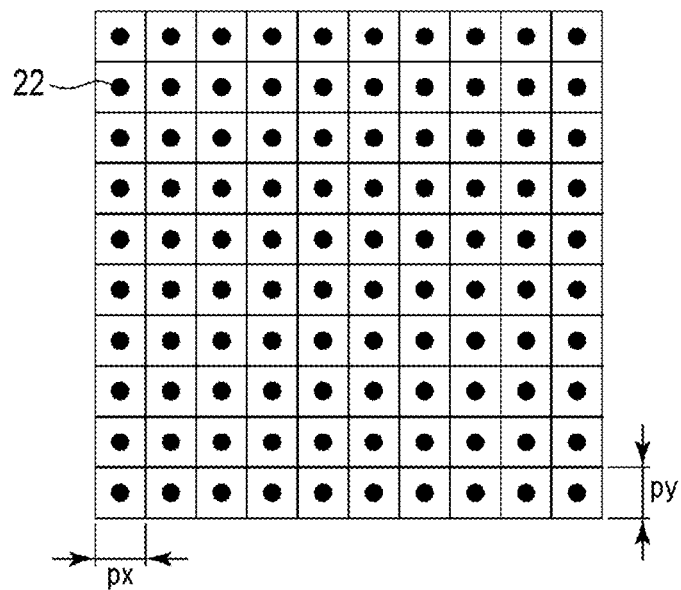
FIG. 2 is a layout plan view illustrating an example of a layout of reconstruction points.

FIG. 2 is a layout plan view illustrating an example of a layout of reconstruction points.

The calculated element region 16 is configured by a plurality of unit blocks 12 and is defined by a viewing angle $\theta$ from a reconstruction point 22. In each unit block 12, phase components of light from the reconstruction point 22 are calculated for reproduction of an image. As shown in the layout example of FIG. 2, a plurality of reconstruction points 22 are arrayed at a pitch of px in the x direction, and at a pitch of py in the y direction.

As shown in FIG. 1A, the calculated element region 16 is a region allowing for the viewing angle $\theta$ from a reconstruction point 22.

Figure 1B:
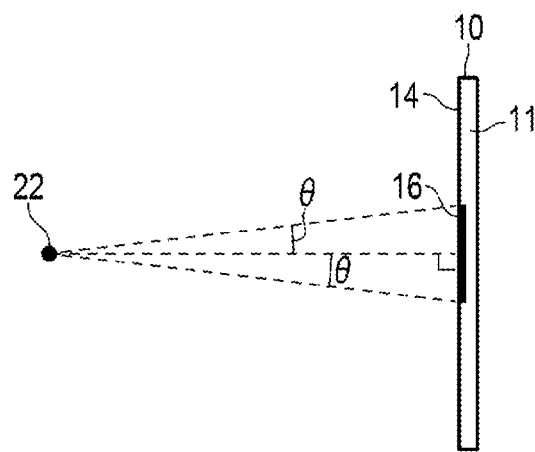
FIG. 1B is a diagram illustrating the optical film 10 of FIG. 1A, as viewed from a lateral side.

FIG. 1B is a diagram illustrating the optical film 10 of FIG. 1A, as viewed from a lateral side.

As shown in FIG. 1B, the viewing angle $\theta$ refers to an angle of a line segment drawn from the center of a reconstruction point 22 toward and perpendicular to the recording surface 14, relative to a line segment drawn therefrom toward an outermost point in the x or y direction of the calculated element region 16.

As the viewing angle $\theta$ becomes larger, the reproduced image will have a broader observation range with higher dynamic effects. However, the broader observation range entails the necessity of diffusing light in the broader range, and thus lowers brightness of the reproduced image.

Furthermore, as the number of the reconstruction points 22 increases, the reproduced image will have higher resolution. However, since the individual reconstruction points 22 need light, the reproduced image will have lower brightness.

Figure 3:
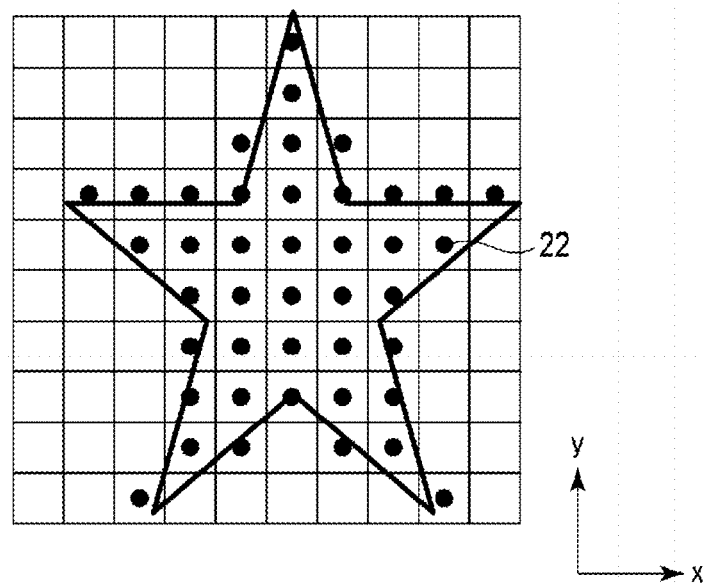
FIG. 3 is a diagram illustrating an example of a design pattern indicated by combining reconstruction points.

FIG. 3 is a diagram illustrating an example of a star-shaped design pattern indicated with a combination of the reconstruction points 22.

In general, 3D polygonal data is used as three-dimensional data for configuring a reconstruction point 22. However, the process of reproducing the 3D polygonal data is complicated. When the reconstruction points 22 are arrayed, as shown in FIG. 2, at a pitch of px in the x direction and at a pitch of py in the y direction, an image data can be used as data for reconstruction points, as shown in FIGS. 4A and 4B.

Figure 4A:
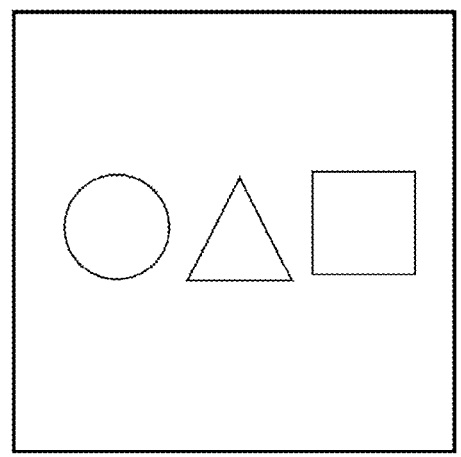
FIG. 4A is a diagram illustrating an image reproduced based on only depth information.

FIG. 4A is a diagram illustrating an image reproduced based on only depth information.

Figure 4B:
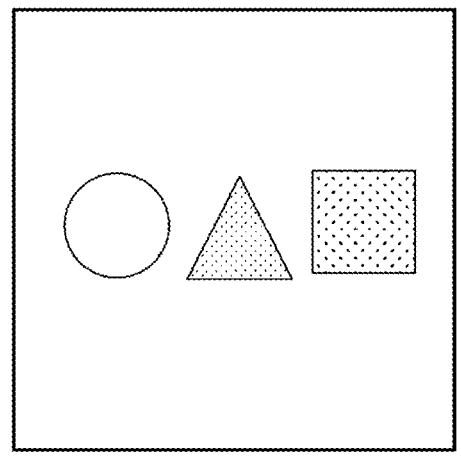
FIG. 4B is a diagram illustrating an image reproduced considering luminance information and depth information.

FIG. 4B is a diagram illustrating an image reproduced by considering luminance information and depth information.

As an example of expressing three-dimensional information, the reproduced image of FIG. 4A is provided with brightness information, including luminance of the reconstruction points 22 and the x-y coordinates, while the reproduced image of FIG. 4B is provided with z- or depth-direction information (depth information) in terms of grayscale values.

Figure 5:
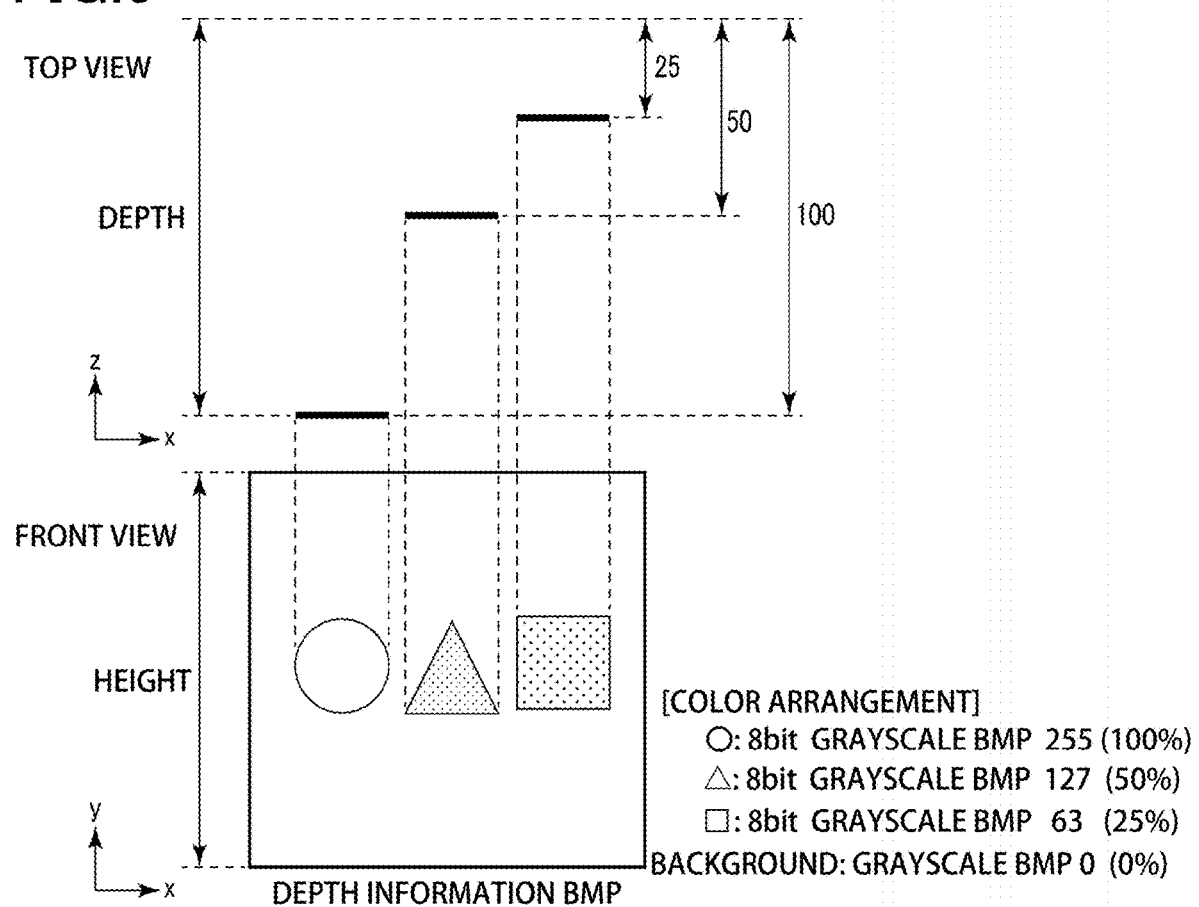
FIG. 5 is a diagram illustrating a concept of depth information.

As shown in FIG. 5, the depth information can be defined by using data having the same number of unit blocks in the longitudinal and lateral directions as those of the image indicating luminance information.

FIG. 5 is a diagram illustrating a concept of depth information.

In the case as shown in FIG. 5, for example, the values of the grayscale image are expressed in terms of the depth direction to provide depth information of 255 gradation levels.

Thus, three-dimensional information can be formulated from image files of (a) luminance information and (b) depth information. Specifically, if (a) luminance information is given to the calculated element region 16, the reconstruction point can be one with brightness gradation, and if not given, the reconstruction point can be one with even brightness.

In this way, in a calculated element region 16 (e.g., first calculated element region), a picture, such as a portrait or a landmark, can be reproduced with a grayscale image at a grayscale reconstruction point. Also, in another calculated element region 16 (e.g., second calculated element region different from the first calculated element region), readable information, such as a trademark, a logo, a symbol or a company name, can be reproduced with a monotone reconstruction image at a monotone reconstruction point. Thus, the reproduced images can simultaneously express artistic value and identification information. These grayscale image and monotone reconstruction image can be presented with improved or even optimum brightness. If images to be displayed are different between the first and second calculated element regions, the necessary number of reconstruction points 22 is usually different between them.

Figure 6A:
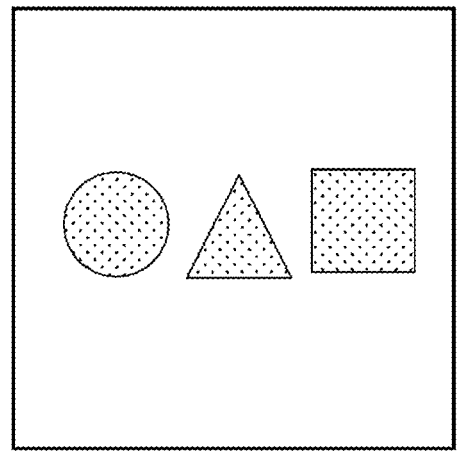
FIG. 6A is a diagram illustrating an image as viewed from an observation angle (from the front) using the information of FIGS. 4A and 4B.
Figure 6B:
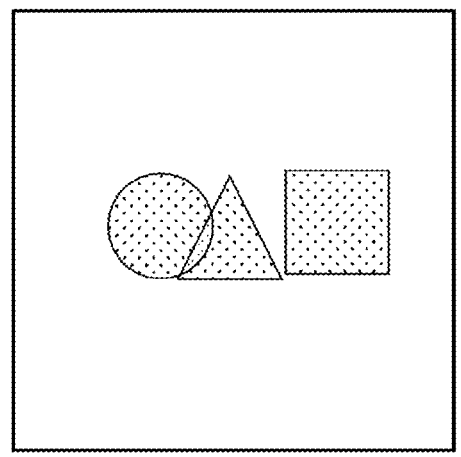
FIG. 6B is a diagram illustrating an image as viewed from an observation angle (at a 10-degree angle) using the information of FIGS. 4A and 4B.
Figure 6C:
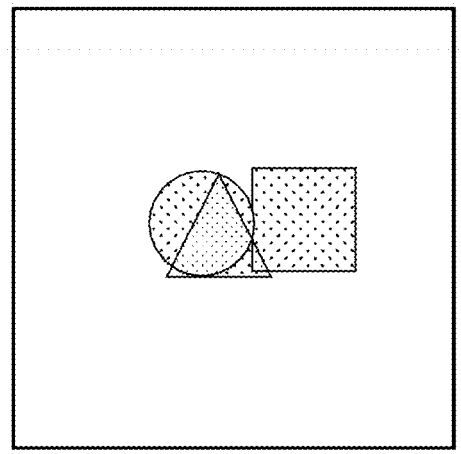
FIG. 6C is a diagram illustrating an image as viewed from an observation angle (at a 20-degree angle) using the information of FIGS. 4A and 4B.

FIGS. 6A, 6B and 6C show simulations of observing an image (a) from the front, (b) at 10-degree angle, and (c) at 20-degree angle, using the information of FIGS. 4A and 4B.

Figure 7:
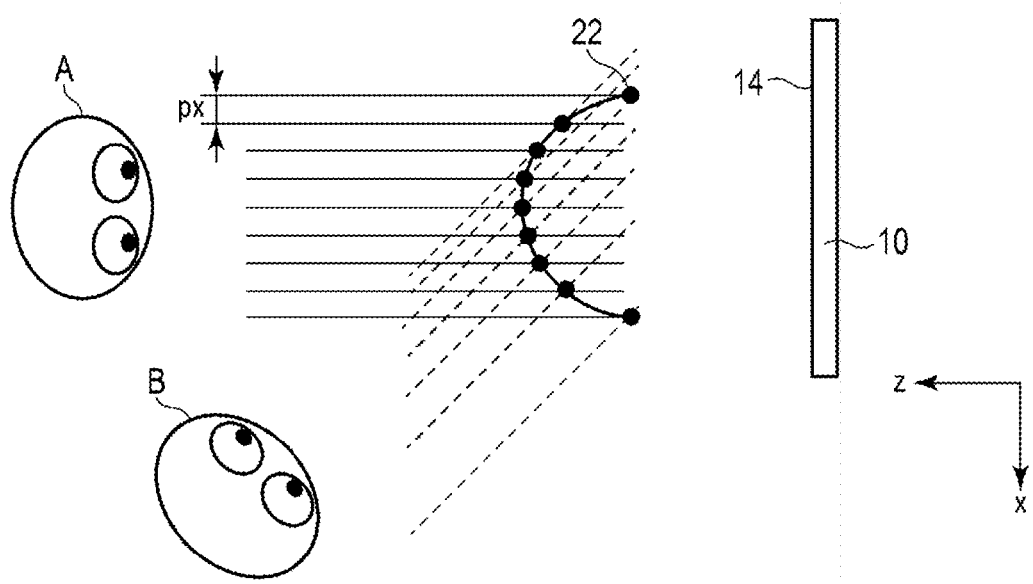
FIG. 7 is a diagram illustrating a principle that the appearance of a reproduced image depends on the observation direction.

FIG. 7 is a diagram illustrating a principle that the appearance of a reproduced image depends on the observation direction.

FIG. 7 shows an example in which the reconstruction points 22 are semi-circularly and three-dimensionally arranged. When the reconstruction points 22 are arrayed, as shown in FIG. 2, at a pitch of px in the x direction and at a pitch of py in the y direction, resolution of the reconstruction points 22 is improved or even maximized when observed by a user A from the front.

In this case, quality of the image as observed obliquely by a user B is deteriorated. However, since the image will be more frequently observed from the front than from an oblique direction, higher priority is given to optimizing the reproduced image as observed from the front. The reconstruction points 22, when observed obliquely, have irregular arrangement intervals. Therefore, brightness artifacts may be perceived when the reconstruction points 22 reproduce an image. In contrast, when observed from the front, artifacts due to brightness of the reconstruction points 22 are less likely to be perceived. Thus, high-quality image is presented as observed from the front.

When the brightness of a reproduced image is taken to be a luminous intensity I (lm/sr) of light seemingly outputted from the reconstruction points 22, the area of each calculated element region 16 has a relationship with the viewing angle θ as formulated in the following.

Herein, the environments where a reproduced image is observed are assumed to have an illuminance E (lx), and the area of each calculated element region 16 is assumed to be S (m²). The area S of the calculated element regions 16 will be, for example, as shown in FIG. 8.

Figure 8:
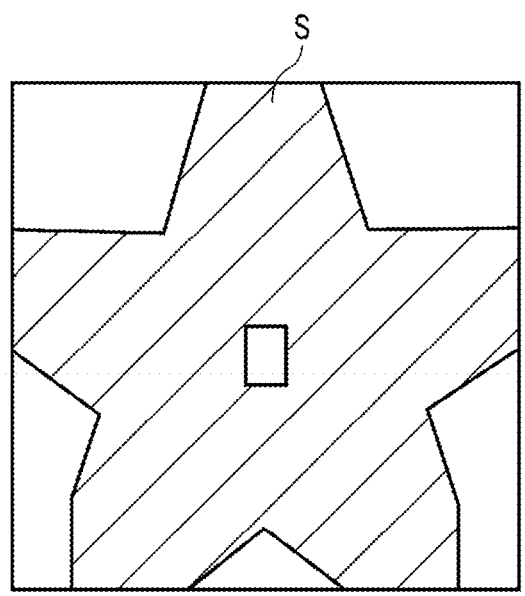
FIG. 8 is a diagram illustrating calculated element regions configured with reconstruction points.

FIG. 8 is a diagram illustrating calculated element regions configured with reconstruction points.

Figure 9A:
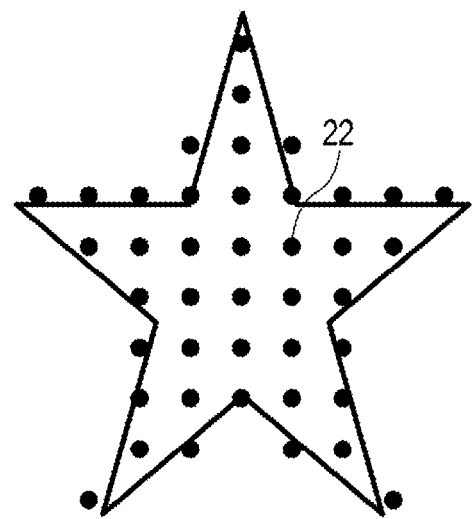
FIG. 9A is a diagram illustrating an arrangement of reconstruction points.

FIG. 9A is a diagram illustrating an arrangement of reconstruction points.

Figure 9B:
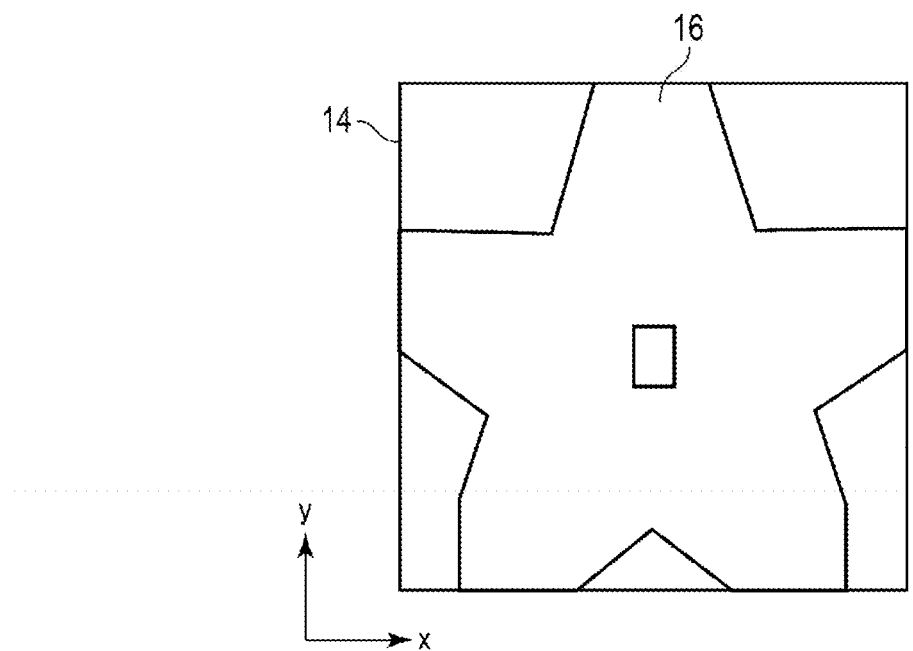
FIG. 9B is a diagram illustrating the entire calculated element regions configured with the reconstruction points.

FIG. 9B is a diagram illustrating the entire calculated element regions 16 configured with the reconstruction points.

FIG. 8 shows by hatching calculated element regions 16 (FIG. 9B) on the recording surface 14, calculated from reconstruction points 22 of FIG. 9A.

When a diffraction efficiency is taken to be δ (0 to 1), the total luminous flux reflected from the calculated element regions 16 will be expressed by Fh (lm)=E·S·δ. When the number of the reconstruction points 22 is taken to be N, the luminous flux per reconstruction point, i.e., an average of the total luminous flux, will be expressed by Fp=Fh/N.

Figure 10:
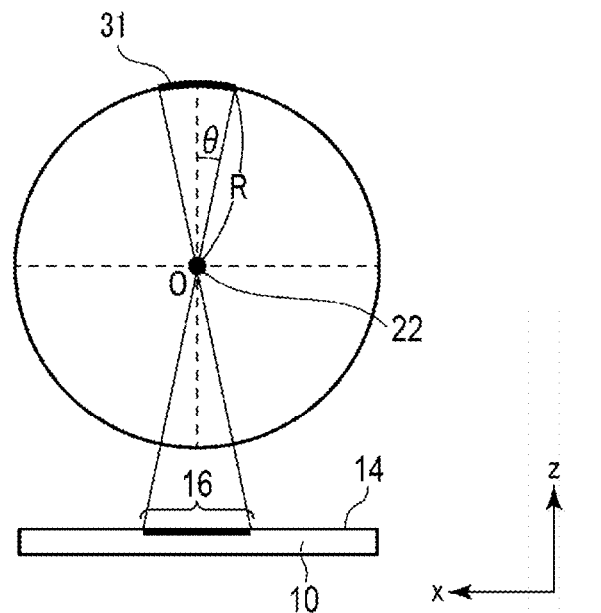
FIG. 10 is a diagram illustrating illuminance in a spherical-cap region.

FIG. 10 is a diagram illustrating illuminance in a spherical-cap region 31.

As shown in FIG. 10, the spherical-cap region 31 in a viewing angle θ, where the distance from a reconstruction point 22 is R, will have an area expressed by Sθ=2πR²(1−cos θ). Accordingly, the spherical-cap region 31 will have an illuminance expressed by E=Fp/Sθ. Furthermore, the luminance intensity I (lm/sr) from the reconstruction point 22 will be expressed by I=E·R². These expressions, when put in order, will be as in the following Formula (1).

[Math. 4]

$$I = \frac{E \cdot S \cdot \delta}{2\pi N(1 \cdot \cos\theta)} \quad (1)$$

Accordingly, if a desired brightness of not less than a threshold luminous intensity $I_{th}$ is required for the reproduced image, a relationship as expressed by the following Formula (2) will be established.

[Math. 5]

$$I_{th} \leq \frac{E \cdot S \cdot \delta}{2\pi N (1 - \cos\theta)} \quad (2)$$

By modifying the above Formula (2), the following Formula (3) is obtained.

[Math. 6]

$$N \leq \frac{E \cdot S \cdot \delta}{2\pi I_{th}(1 - \cos\theta)} \quad (3)$$

It should be noted that, by using a blazed phase distribution, diffraction efficiency approximate in value to the maximal 100% can be achieved for a specific wavelength. Specifically, by using a blazed phase distribution, δ=1 can be established. The environments for observing a produced image may be mainly the interior of a room. Under such environments, or under working environments, the illuminance E based on JIS Z9110:2010 will be about minimal 100 (lx) and maximal 1,500 (lx).

Considering the above, appearance of a reproduced image in room interior environments in relation to N reconstruction points 22 may be required to be researched. For this research, several images were reproduced, for visual observation, which were different from each other in area S of calculated element region 16, and in brightness of N reconstruction points 22. The results are shown in FIGS. 11, 12A and 12B.

Figure 11:
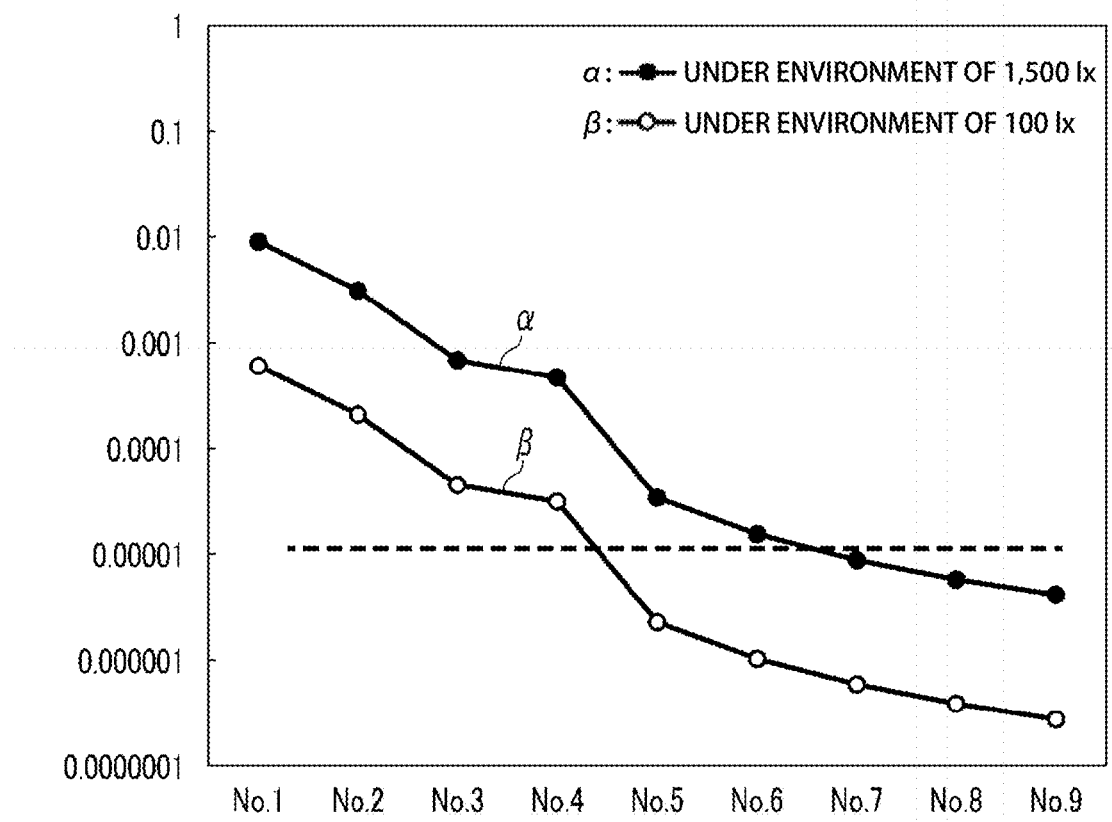
FIG. 11 is a diagram illustrating test results of luminous intensity for various samples.

FIG. 11 is a diagram illustrating the test results of luminous intensity for various samples.

FIG. 12A is a diagram listing conditions of samples and assessments thereof (well-lit observation conditions).

FIG. 12B is a diagram listing conditions of samples and assessments thereof (dark observation conditions).

In FIG. 11, the vertical axis indicates luminous intensity and the horizontal axis indicates sample number. It is known that luminous intensity works logarithmically upon the human eye. Accordingly, the vertical axis is expressed in logarithmic form. Specific conditions of the individual sample numbers are as shown in FIGS. 12A and 12B. The curve α of FIG. 11 was obtained under conditions shown in FIG. 12A, with the environmental illuminance E being 1,500 (lx). The curve β of FIG. 11 was obtained under conditions shown in FIG. 12B, with the environmental illuminance E being 100 (lx).

The method of reproducing Sample Nos. 1 to 9 will be described. Specifically, first, phase components were calculated from an input image having three-dimensional information, and the results of the calculation were outputted as a BMP image. The outputted BMP image was exposed to a resist using an electron beam exposure device, followed by development. Then, the developed resist was Ni-sputtered to 50 nm, followed by electrocasting, thereby obtaining an electrocast plate. Then, from the resultant electrocast plate, a duplicate was formed on a PET (polyethylene terephthalate) substrate by use of a UV-curable resin. Furthermore, the resultant duplicate on the PET substrate was Al-deposited to 50 nm. Thus, Sample Nos. 1 to 9 were prepared.

As can be seen from the curve α of FIG. 11 and FIG. 12A, when the environmental illuminance E was 1,500 (lx), Sample No. 6 had brightness within an allowable range, while Sample No. 7 had slightly low brightness, and Sample No. 8 presented a dark image which was difficult to visually recognize. The expression "difficult to visually recognize" refers to that the design pattern of the reproduced image could not be identified.

As can be seen from the curve β of FIG. 11 and FIG. 12B, when the environmental illuminance E was 100 (lx), Sample No. 4 had brightness within an allowable range, while Sample No. 5 presented a dark image which was difficult to visually recognize.

As a result, it was found that luminous intensity of 1.2E-5 (cd) was critical for the human eye to visually recognize the reconstruction points 22 that each had three-dimensional information as reproduced. It is generally known that the human eye has a higher eyesight under environments of higher illuminance. However, the reproduced images of Sample Nos. 1 to 9 all corresponded to observation from a distance of about 200 nm which was extremely short. Therefore, there was no difference in critical value of luminous intensity enabling visual recognition between the samples due to difference in illuminance.

According to the findings set forth above, the following Formula (4) is established based on Formula (3).

[Math. 7]

$$N \leq \frac{2\theta S}{1 - \cos\theta} \quad (4)$$

A description will now be given of calculation of a phase angle based on a phase component performed by a computer.

A phase angle ϕ is calculated by a computer from a phase component W(x, y) according to the following formula.

[Math. 8]

$$W(kx, ky) = \sum_{n=0}^{Nmax} \sum_{kx=Ymin}^{Ymax} \sum_{kx=Xmin}^{Xmax} amp \cdot \exp(i\phi)$$

$$\phi = \frac{\pi}{\lambda \cdot O_n(z)} \{(O_n(x) - kx)^2 + (O_n(y) - ky)^2\}$$

In the formula, i is an imaginary number, λ is a wavelength of light at the time of reproducing an image at a reconstruction point 22, $O_n(x, y, z)$ is a coordinate of a reconstruction point 22, (kx, ky, O) is a coordinate of a unit block 12.

Figure 13:
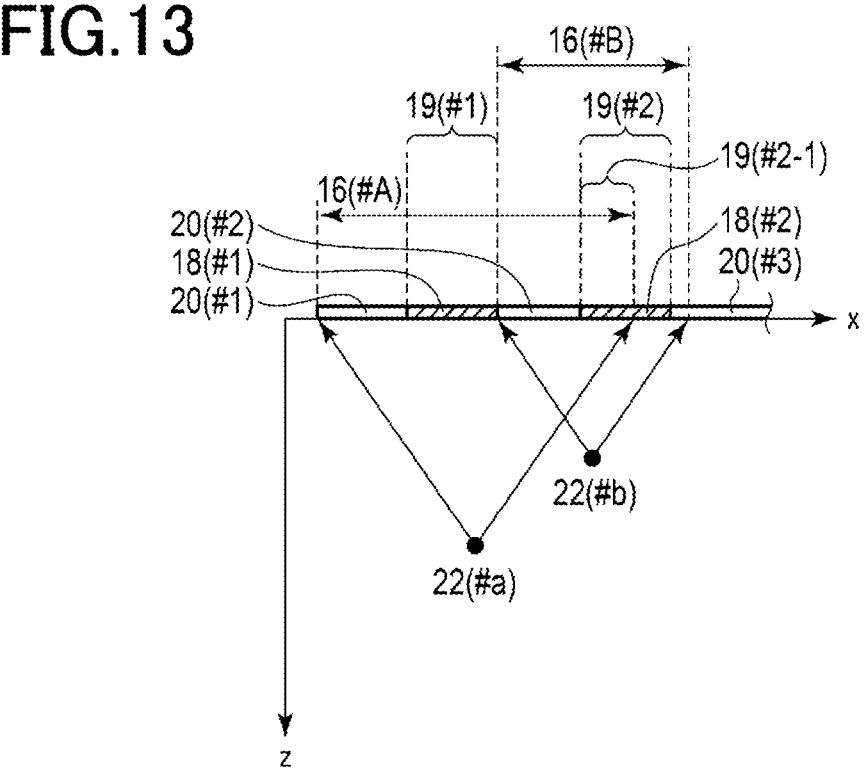
FIG. 13 is a diagram illustrating an example of overlaps of calculated element regions.

FIG. 13 is a diagram illustrating a plurality of calculated element regions with overlaps.

First, the computer calculates, as shown in FIG. 13, for example, a phase component W(x, y) of light from one reconstruction point 22(#a), targeting unit blocks 12 which are contained in an overlap region 19(#1) and an overlap region 19(#2-1). In the overlap region 19(#1), a calculated element region 16(#A) defined by the reconstruction point 22(#a) overlaps with a phase angle recording region 18(#1). In the overlap region 19(#2-1), the calculated element region 16(#A) overlaps with part of a phase angle recording region 18(#2).

There are one or more reconstruction points 22. Accordingly, calculated element regions 16 and reconstruction points 22 are present on a one-to-one basis. In other words, the number of calculated element regions 16 is the same as the number of the one or more reconstruction points 22.

If there are a plurality of reconstruction points 22, the computer further calculates, as shown in FIG. 13, for example, a phase component W(x, y) of light from another reconstruction point 22(#b), targeting unit blocks 12 which are contained in an overlap region 19(#2). In the overlap region 19(#2), a calculated element region 16(#B) defined by the reconstruction point 22(#b) overlaps with a phase angle recording region 18(#2).

As shown in FIG. 13, if two calculated element regions 16(#A) and 16(#B) overlap with each other, the computer calculates a sum of the phase components W(x, y).

Furthermore, the computer calculates a phase angle ϕ, based on each calculated phase component W(x, y), and records numerical information of the calculated phase angle ϕ on the corresponding overlap region 19.

As the number of times of recording numerical information of unit blocks 12 increases, the amount of information and the time of calculation increase accordingly. An excessive amount of information can be a cause of deteriorating contrast of the image reproduced at each reconstruction point 22. Therefore, to reproduce a clearer image, the amount of overlaps is preferably small in portions where the phase angle recording regions 18 of a plurality of construction points 22(#a, #b) overlap with each other as, for example, in the overlap region 19(#2-1), and the number of overlaps is preferably small.

Thus, if there are a plurality of calculated element regions 16 on the recording surface 14, ideally, these calculated element regions 16 are ensured not to overlap with each other at least in the phase angle recording regions 18.

The computer then calculates a phase component W(x, y) for each unit block 12 in the overlap region 19 where a calculated element region 16 defined by the viewing angle θ overlaps with a phase angle recording region 18, and calculates a phase angle ϕ from the phase component W(x, y). Since the upper limit of the viewing angle θ is defined as described above, and the region for which a phase angle ϕ is calculated is limited to the overlap region 19, the time taken for calculation is shortened. The calculated phase angle ϕ is recorded in the corresponding unit block 12 in the overlap region 19.

Figure 14:
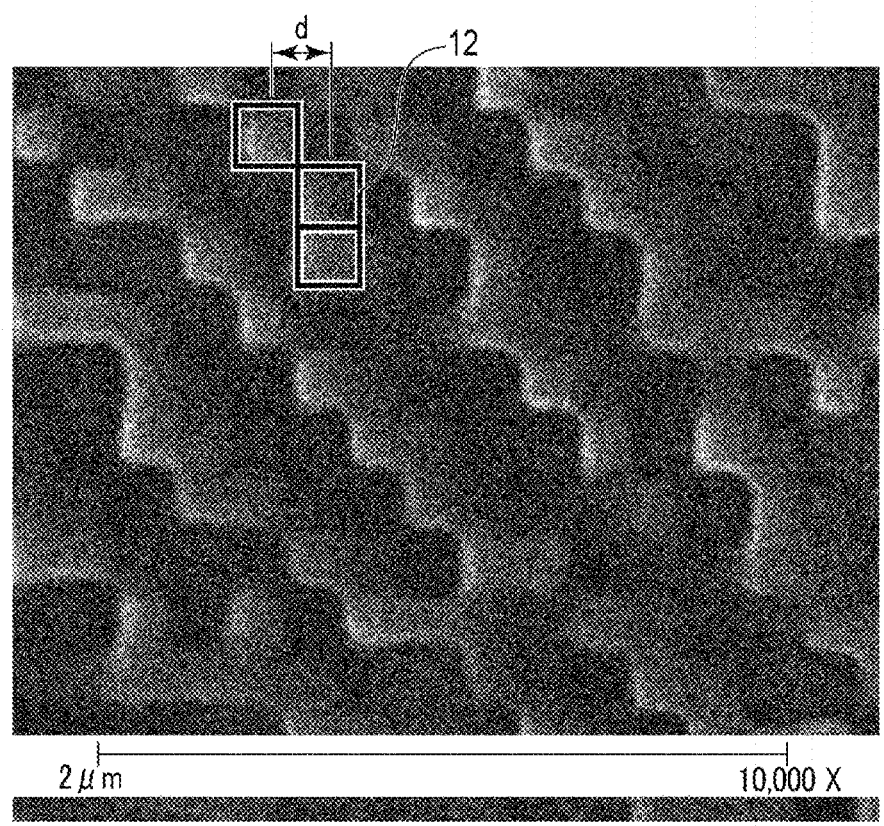
FIG. 14 is an SEM image showing an example of unit blocks where respective phase angles are recorded.

FIG. 14 is an SEM image showing an example of unit blocks 12 where respective phase angles ϕ are recorded.

Figure 15A:
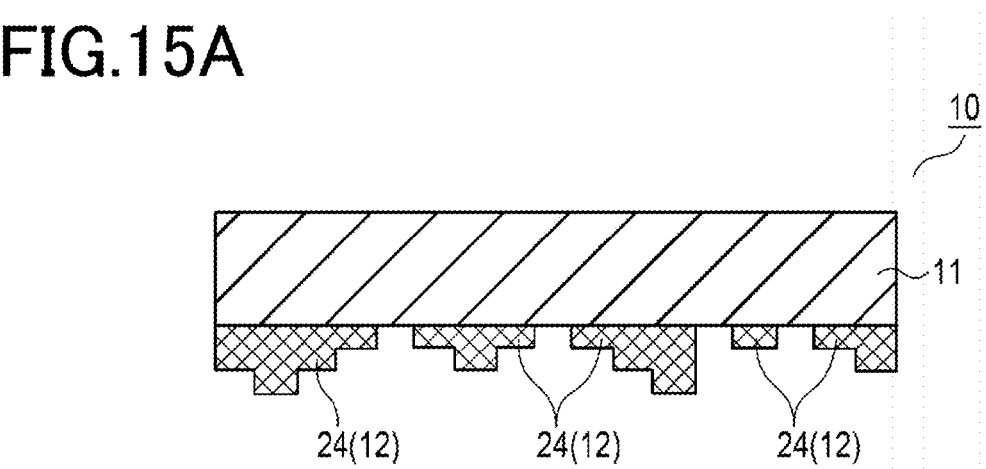
FIG. 15A is a cross-sectional view illustrating an example of an optical film in which unevenness conforming to phase angles is formed (in the absence of a reflective layer).

FIG. 15A is a cross-sectional view illustrating an example of unit blocks in which unevenness conforming to phase angles is formed (in the absence of a reflective layer).

Figure 15B:
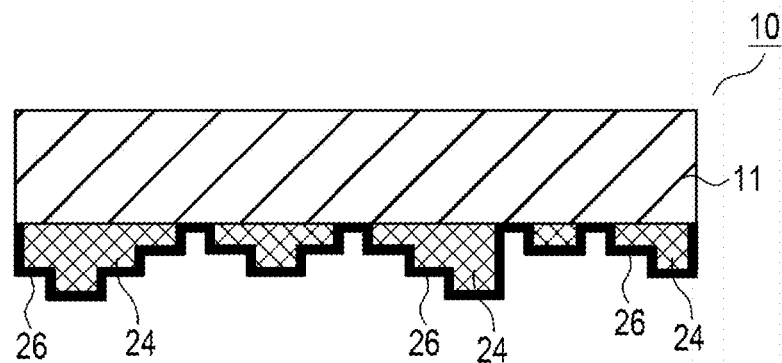
FIG. 15B is a cross-sectional view illustrating an example of an optical film in which unevenness conforming to phase angles is formed (in the presence of a reflective layer).

FIG. 15B is a cross-sectional view illustrating an example of unit blocks in which unevenness conforming to phase angles is formed (in the presence of a reflective layer).

The unit blocks 12 shown in FIG. 14 are each in a square shape with a length d on a side, and are two-dimensionally arrayed at an interval d in both x and y directions. Using an original plate for these unit blocks, unevenness is formed, as shown in FIG. 15A, for example, on a phase angle recording layer 24 of a thermoplastic resin, a thermosetting resin, a UV resin, or the like formed on a surface of a substrate 11. Thus, unit blocks 12 are obtained, with unevenness conforming to the phase angles being formed.

If reflected light is to be observed, a reflective layer 26 may be applied, as shown in FIG. 15B, to the surface of the phase angle recording layer 24. If transmitted light alone is to be observed without observing reflected light, the reflective layer 26 does not need to be applied, as shown in FIG. 15A, to the surface of the phase angle recording layer 24.

A description so far has been given of an example of forming unit blocks 12, with unevenness being formed conforming to the phase angles ϕ, by use of an original plate. As another method, a silver halide exposure material may be exposed and developed, and then bleached, followed by modifying the developed silver into a silver salt, such as silver halide, to make the material transparent. Alternatively, a thermoplastic or the like, whose refraction index or surface configuration changes due to light, may be used.

Figure 16A:
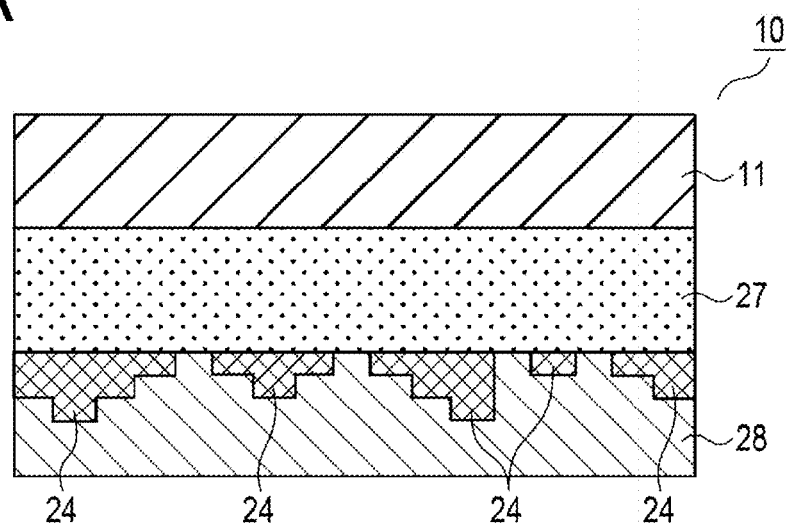
FIG. 16A is a cross-sectional view illustrating an application example of the optical film shown in FIG. 15A (in the absence of a reflective layer).

FIG. 16A is a cross-sectional view illustrating an application example of the unit blocks shown in FIG. 15A (in the absence of a reflective layer).

Figure 16B:
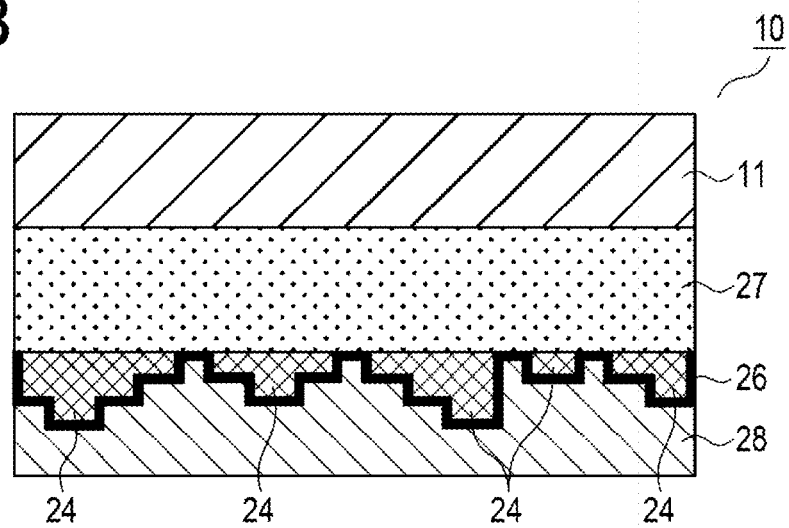
FIG. 16B is a cross-sectional view illustrating an application example of the optical film shown in FIG. 15B (in the presence of a reflective layer).

FIG. 16B is a cross-sectional view illustrating an application example of the unit blocks shown in FIG. 15B (in the presence of a reflective layer).

FIGS. 16A and 16B each show a cross-sectional view of an optical film 10 configured, as necessary, by laminating a release layer 27 on the substrate 11, further laminating a phase angle recording layer 24 on the release layer 27, and further laminating an adhesive layer 28 on the phase angle recording layer 24, so as to be bonded to an object via the adhesive layer 28. FIGS. 16A and 16B respectively correspond to FIGS. 15A and 15B. Specifically, FIG. 16A is a cross-sectional view illustrating a configuration example of an optical film 10 without application of a reflective layer 26 onto a phase angle recording layer 24, and FIG. 16B is a cross-sectional view illustrating a configuration example of an optical film 10 with application of a reflective layer 26 onto a phase angle recording layer 24.

Figure 17A:
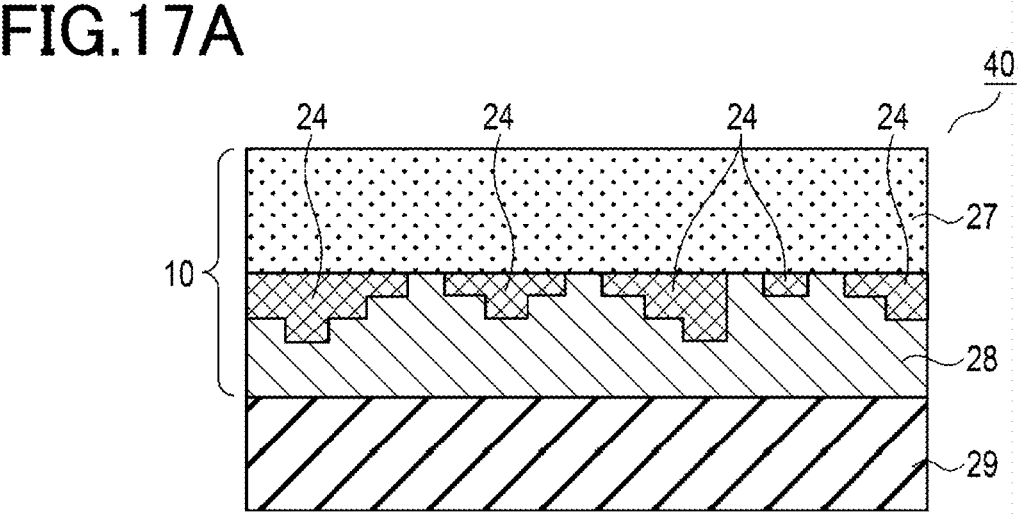
FIG. 17A is a cross-sectional view illustrating a configuration example of a display body containing an optical film corresponding to FIG. 16A (in the absence of a reflective layer).
Figure 17B:
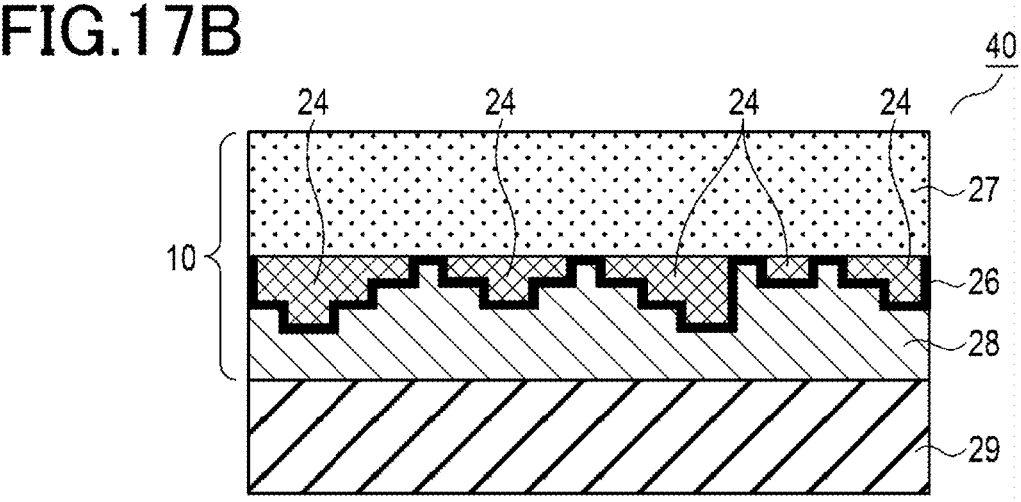
FIG. 17B is a cross-sectional view illustrating a configuration example of a display body containing an optical film corresponding to FIG. 16B (in the presence of a reflective layer).

FIGS. 17A and 17B respectively correspond to FIGS. 16A and 16B. Specifically, FIGS. 17A and 17B are cross-sectional views each showing a display body 40 containing the optical film 10 that has been transferred to an object 29 via the adhesive layer 28, followed by releasing the substrate 11 from the release layer 27.

The material used for the substrate 11 may be a rigid material, such as a glass substrate, or may be a film substrate. For example, the substrate 11 may be a plastic film made such as of PET, PEN (polyethylene naphthalate), or PP (polypropylene). Preferably, the material of the substrate 11 may be one that is less likely to deform or alter due to heat, pressure, or the like applied at the time of providing the phase angle recording layer 24. Depending on the usage or purpose, paper, synthetic paper, plastic multilayer paper, resin-impregnated paper, or the like may be used as the substrate 11.

The release layer 27 may be made of a resin or a lubricant. The resin may be a thermoplastic resin, a thermosetting resin, an ultraviolet curable resin, or an electron beam curable resin. The resin may be an acrylic resin, a polyester resin, or a polyamide resin. The lubricant may preferably be a wax of polyethylene powder, a paraffin wax, silicone wax, carnauba wax, or the like. As a release layer 27, these materials may be applied to the substrate 11 by a known coating method, such as gravure printing, or micro gravure printing. The release layer 27 may have a thickness in the range of 0.1 μm to 2 μm.

The phase angle recording layer 24 may be made of a resin. The resin may preferably be a thermoplastic resin, a thermosetting resin, an ultraviolet curable resin, a thermoformable material having a radically polymerizable unsaturated group, an electron beam curable resin, or the like. Resins that can be used may be urethane resins, polycarbonate resins, polystyrene resins, thermoplastic resins of polyvinyl chloride resins, unsaturated polyester resins, melamine resins, epoxy resins, urethane (meth)acrylate, polyester (meth)acrylate, epoxy (meth)acrylate, polyol (meth)acrylate, melamine (meth)acrylate, or triazine (meth) acrylate. The phase angle recording layer 24 may have a thickness in the range of 0.5 μm to 5 μm.

The reflective layer 26 may be formed of an ink. Depending on the printing method, the ink may be an offset ink, a letterpress ink, a gravure ink, or the like. Also, depending on the composition, the ink may be a resin ink, an oil-based ink, or a water-based ink. Furthermore, depending on the drying method, the ink may be an oxidative polymerization type ink, a penetrative drying type ink, an evaporation drying type ink, or an ultraviolet curable ink.

As an example of the material for the reflective layer 26, a functional ink whose color changes according to the illumination angle or the observation angle may be used. Such a functional ink may be an optically variable ink, a color shift ink, or a pearl ink.

The material for the reflective layer 26 may be an inorganic compound. The inorganic compound may preferably be a metal compound which may be $TiO_2$, $Si_2O_3$, SiO, $Fe_2O_3$ or ZnS. Inorganic compounds have a high refractive index and easily increase reflectance. The material for the reflective layer 26 may be metal. The metal may be Al, Ag, Sn, Cr, Ni, Cu or Au. A reflective layer 26 of an inorganic material or metal can be formed by vapor-phase deposition. The vapor-phase deposition may be evaporation, CVD or sputtering. The reflective layer 26 may have a thickness of 40 nm or more and 1,000 nm or less. The reflective layer 26 may have a reflectance of 30% or more and 70% or less. A reflectance of 30% or more can achieve adequate reflection even when there is a base printed layer. If the reflectance is more than 70%, the base printed layer is less likely to be observed.

The display bodies 40 shown in FIGS. 17A and 17B are each configured by bonding the optical film 10 to the object 29. The object 29 may be a paper currency, coupon, stamp, card, signage, poster, tag, seal, or the like. The adhesive layer 28 only needs to adhere to the object 29, and thus an adhesive or the like of whatever quality may be used.

The object 29 may be made of a material, such as paper or polymer, to which the optical film can be bonded via the adhesive layer 28, but is not particularly limited.

The display body 40 may be provided, on its surface, with a protective layer (not shown) to prevent occurrence of blur in a reproduced image, which may be easily caused by friction or the like. The protective layer may be imparted with hard coating properties. The hard coating properties refer to hardness of H or more and 5H or less confirmed in the pencil hardness test (JIS K5600 5-4).

The display body 40 may preferably have a surface gloss at 20° (Gs(20°)) in the range of 15 or more and 70 or less. If the surface gloss at 20° (Gs(20°)) is less than 15, non-glare properties become prominent, and the reconstruction point 22 cannot reproduce a good image. If the surface gloss at 20° (Gs(20°)) exceeds 70, non-glare properties become insufficient, and reflected light may appear in the reproduced image, making it difficult to capture or observe the reproduced image. More preferably, the surface gloss at 20° (Gs(20°)) may be in the range of 20 or more and 60 or less.

The phase angle recording layer 24 may have a transmission image defined by (C(0.125)+C(0.5)+C(1.0)+C(2.0)) of 200% or more. Furthermore, the phase angle recording layer 24 may have a haze (Hz) of 1.0% or more and 25% or less. Gloss at 20° was measured using a gloss meter (Micro-Tri-Gloss manufactured by BYK-Gardner), based on JIS-K7105-1981. Transmission image definition was measured using an image clarity measuring instrument (product name: ICM-lDP, manufactured by Suga Test Instruments Co., Ltd.), based on JIS-K7105-1981.

Light that transmits through the non-glare film can be calculated from a maximum wavelength M and a minimum wavelength m, which are measured by permitting light to pass through a moving optical comb, based on a formula $C=(M-m)/(M+m)\times 100$. Transmission image definition C (%) indicates clarity of an image. A larger value of transmission image definition means better clarity of the image. Since optical combs of four different widths (0.125 mm, 0.5 mm, 1.0 mm and 2.0 mm) were used for the measurement, $100\%\times 4=400/9$ will be the maximum value.

Haze (Hz) was measured using a haze meter (NDH2000 manufactured by NIPPON DENSHOKU INDUSTRIES, CO., LTD.), based on JIS-K7105-1981.

Total luminous reflectance can be measured based on JIS-K7105 using a spectrophotometer which may, for example, be a U-4100 manufactured by Hitachi High-Technologies Corporation, and an integrating sphere.

As a modification, an optical film 10 may be configured by directly laminating a phase recording layer 24 on a substrate 11 without forming a release layer 27.

Figure 18A:
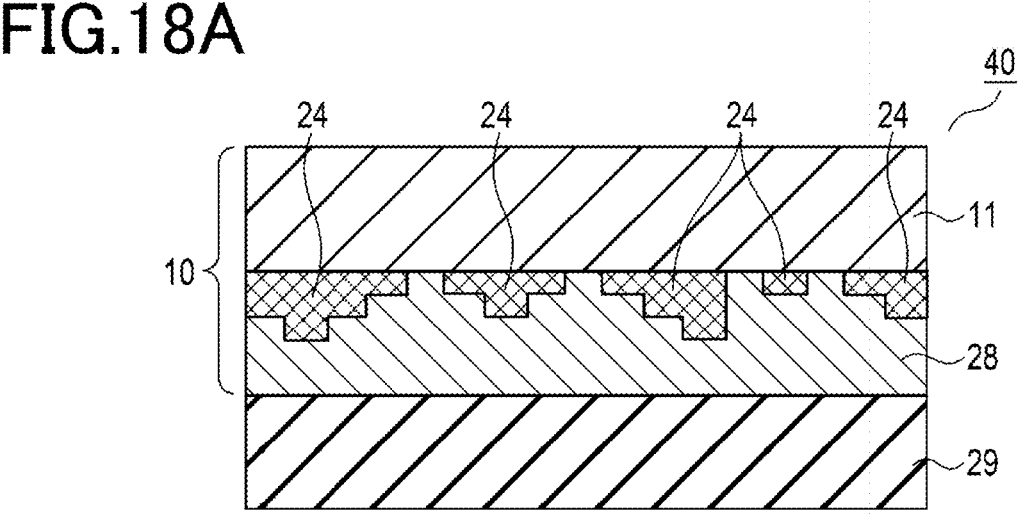
FIG. 18A is a cross-sectional view illustrating a configuration example of a display body in which the optical film shown in FIG. 17A is bonded to an object (in the absence of a reflective layer).
Figure 18B:
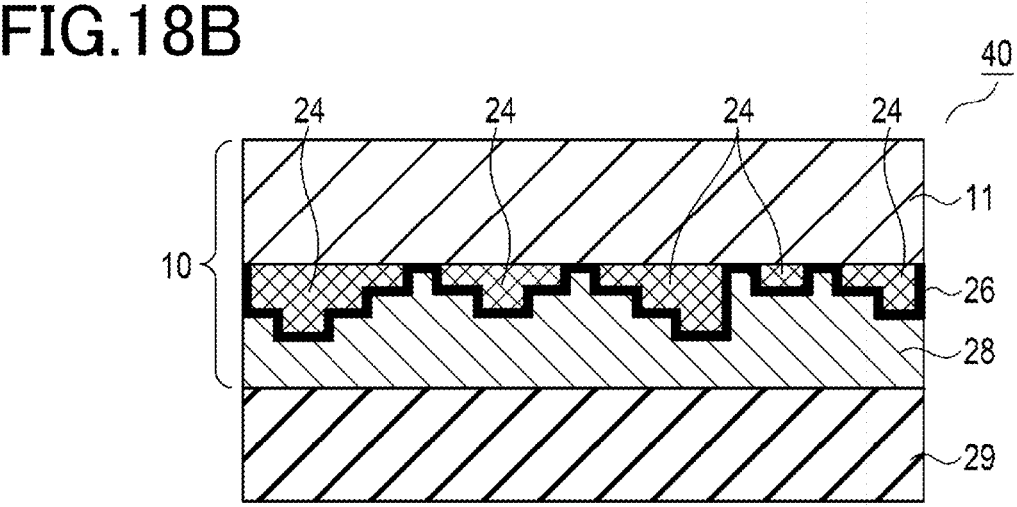
FIG. 18B is a cross-sectional view illustrating a configuration example of a display body in which the optical film shown in FIG. 17B is bonded to an object (in the presence of a reflective layer).

FIGS. 18A and 18B are cross-sectional views each illustrating a configuration example of a display body 40 in which such an optical film 10 is bonded to an object 29.

In this case, since there is no release layer 27, as shown in FIGS. 18A and 18B, the substrate 11 remains after bonding of the optical film 10 to the object 29.

The following description addresses advantageous effects of the optical film 10 according to the embodiment of the present disclosure configured as set forth above.

First of all, when an image is reproduced based on the calculation of a computer for the optical film 10 of the present embodiment, the upper limit of the viewing angle θ from each reconstruction point 22 is defined.

Then, the computer calculates a phase component W(x, y) for each unit block 12 in a calculated element region 16 which is defined by the viewing angle θ, followed by calculating a phase angle ϕ from the phase component W(x, y). Since the upper limit of the viewing angle θ is defined as mentioned above, and the region for which a phase angle ϕ is calculated is limited, the time taken for calculation is shortened. Then, the calculated phase angle ϕ is recorded in the corresponding unit block 12 in the calculated element region 16.

Thus, an image is reproduced at the reconstruction point 22 only when light is applied to the calculated element region 16. Accordingly, image reproduction at the reconstruction point 22 can be made dependent on the control of applied light. Moreover, in the present embodiment, only a phase angle ϕ is calculated, allowing the amplitude information of light to remain unchanged. Specifically, only the phase component W(x, y) of light is modulated while, logically, the amplitude of light is not modulated. Thus, light can be controlled, with a high luminance being maintained, without changing brightness.

As stated above, as the viewing angle θ becomes larger, the reproduced image will have a broader observation range with higher dynamic effects. However, the broader observation range entails necessity of diffusing light in a broader range, and thus lowers brightness of the reproduced image.

In this regard, the optical film 10 of the present embodiment can minimize lowering of brightness of a reproduced image because an upper limit is set for the viewing angle θ. Furthermore, since a range contributing as noise is no longer calculated, noise is prevented from being superimposed on the reconstruction point 22 when reproducing an image thereon, thereby reproducing a clearer image.

Furthermore, as stated above, as the number of the reconstruction points 22 increases, the reproduced image will have higher resolution; however, since the individual reconstruction points 22 need light, the reproduced image will have lower brightness.

In this regard, the optical film 10 of the present embodiment can be reproduced while keeping track of the upper limit number of the reconstruction points 22 that can maintain desired brightness, based on Formula (3) set forth above. Specifically, while maximizing resolution of the reconstruction points 22 when the reproduced image is observed from the front, N reconstruction points can be determined in terms of the viewing angle θ and the area S of each calculated element region to ensure brightness required for observation.

Application Examples

The following description addresses application examples of recording personal authentication information into the optical film 10 of the embodiment described above.

To use the optical film 10 of the present embodiment for recording personal authentication information, a pattern with a meaningful shape is formed in the calculated element region 16, so that the image reproduced at the reconstruction point 22 will be meaningful. For example, a pattern with a meaningful shape, such as the user's personal name, or a facial photo, is formed in the calculated element region 16.

Figure 19:
FIG. 19 is a diagram illustrating an example of an identification card provided with a reproduced image.

Thus, an image 17 according to the pattern is reproduced, as shown in FIG. 19, for example, at the reconstruction point of a personal authentication medium 30, such as an identification card.

FIG. 19 is a diagram illustrating an example of an identification card provided with a reproduced image.

The reproduced image 17 shown in FIG. 19 exerts three-dimensional dynamic effects and is visually recognizable. The reproduced image 17 can show not only a design pattern, but also a text.

Furthermore, in a calculated element region 16 (e.g., first calculated element region), the reconstruction point can be a grayscale reconstruction point having brightness gradation if the amplitude is modulated, and in another calculated element region 16 (e.g., second calculated element region), the reconstruction point can be a monotone reconstruction point having even brightness if the amplitude is modulated. Accordingly, as shown in FIG. 20, for example, a picture, such as a portrait or a landmark, can be reproduced with a grayscale image T reproduced by the grayscale reconstruction point, and readable information, such as a trademark, a logo, a symbol or a company name, can be reproduced with a monotone reconstruction image H reproduced by the monotone reconstruction point.

Figure 20:
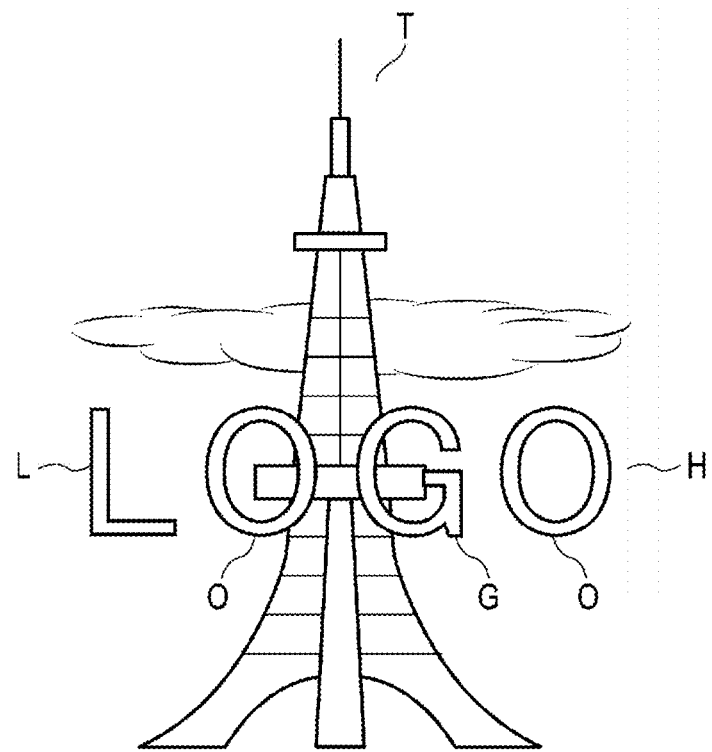
FIG. 20 is a diagram illustrating an example of displaying a picture with a grayscale image reproduced at a grayscale reconstruction point, and displaying readable information with a monotone reconstruction image reproduced at a monotone reconstruction point.

FIG. 20 is a diagram illustrating an example displaying a picture with a grayscale image reproduced at a grayscale reconstruction point, and readable information with a monotone reconstruction image reproduced at a monotone reconstruction point.

As shown in FIG. 20, a reproduced image can simultaneously show artistic value and identification information. In this case, the grayscale image T and the monotone reconstruction image H can be presented with improved or even optimum brightness. In the monotone reconstruction image H, a specific color can be strongly diffracted by making the depth constant. Thus, the information presented by the monotone reconstruction image H can be visually impressive. Furthermore, a region (e.g., region L) of the monotone reconstruction image H may be given a specific color, another region (e.g., region G) may be given a different color, and the remaining regions (e.g., regions O) may be given an achromatic color. Thus, national colors, for example, can be reproduced.

(Modification 1)

As described in the embodiment set forth above, numerical information of a phase angle $\phi$ is recorded in the corresponding unit block 12 of a calculated element region 16. In the present modification, instead of recording numerical information of a phase angle $\phi$ on the corresponding unit block 12 of a calculated element region 16, the computer converts a phase angle $\phi$ into height of unevenness of the corresponding unit block 12, and forms unevenness having the height corresponding to the phase angle $\phi$ in the unit block 12 of the calculated element region 16. Thus, the phase angle $\phi$ is recorded in the unit block 12 of the calculated element region 16.

Figure 21A:
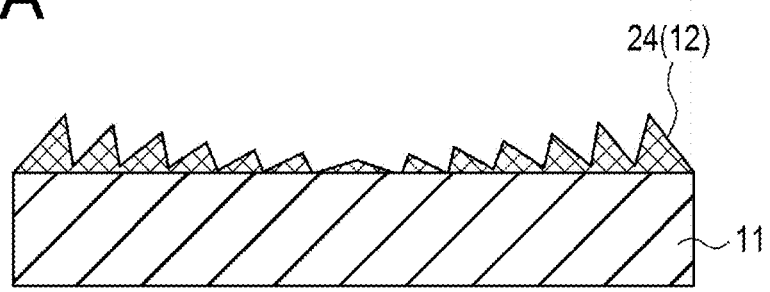
FIG. 21A is a cross-sectional view illustrating an example of unit blocks in which unevenness conforming to phase angles is formed (in the absence of a reflective layer).

FIG. 21A is a cross-sectional view illustrating an example of unit blocks 12 in which unevenness conforming to phase angles $\phi$ is formed (in the absence of a reflective layer).

Figure 22A:
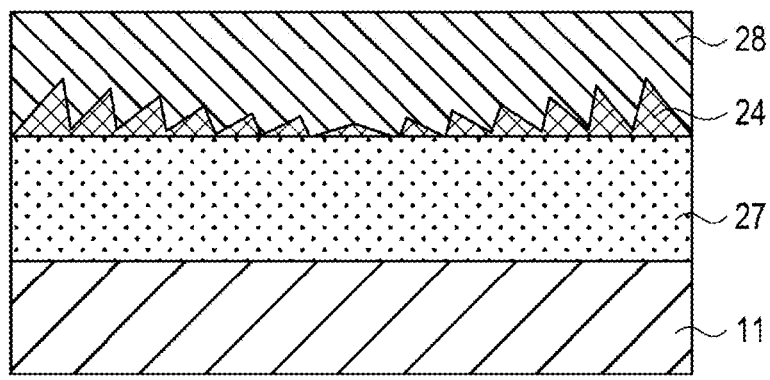
FIG. 22A is a cross-sectional view illustrating an application example of unit blocks in which unevenness conforming to phase angles is formed (in the absence of a reflective layer).
Figure 22B:
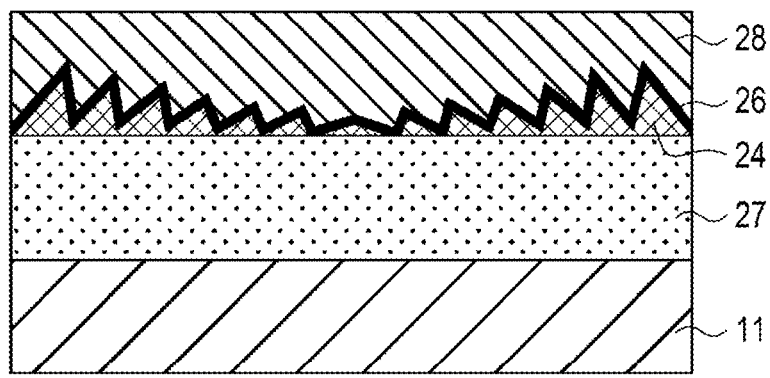
FIG. 22B is a cross-sectional view illustrating an application example of unit blocks in which unevenness conforming to phase angles is formed (in the presence of a reflective layer).

FIG. 22B is a cross-sectional view illustrating an example of unit blocks 12 in which unevenness conforming to phase angles $\phi$ is formed (in the presence of a reflective layer).

When converting each phase angle $\phi$ into height of unevenness, the computer calculates the phase angle $\phi$ in the range of $0\pi$ to $2\pi$, and converts the resultant value into an 8-bit grayscale value, for output to the image. In this case, $2\pi$ corresponds to the level 255 of the 8-bit grayscale value. Then, based on the results of the calculation, a pattern is drawn on a resist substrate by use of an electron beam exposure device.

If the electron beam exposure device is not compatible with multi-level exposure, the same portion may be exposed multiple times to achieve an exposure approximate to multi-level exposure. Three exposures may achieve an expression corresponding to eight-stage multi-level exposure. After that, the resist is developed, and the developed resist is electrocast to thereby obtain an original plate.

Using the original plate, unevenness is formed, as shown in FIG. 21A, for example, on a phase angle recording layer 24 of a thermoplastic resin, a thermosetting resin, a UV resin, or the like provided to a substrate 11. Thus, unit blocks 12 are obtained, with unevenness conforming to the phase angles $\phi$ being formed.

Figure 21B:
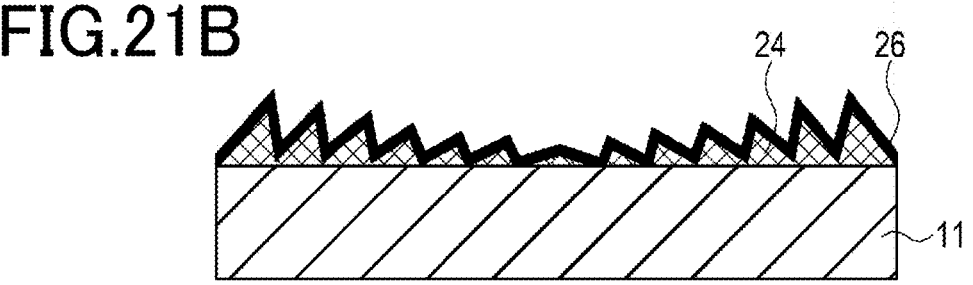
FIG. 21B is a cross-sectional view illustrating an example of a unit block in which unevenness corresponding to phase angles is formed (in the presence of a reflective layer).

If reflected light is to be observed, a reflective layer 26, e.g., a metal layer, may be applied, as shown in FIG. 21B, to the surface of the phase angle recording layer 24. If transmitted light alone is to be observed without observing reflected light, the reflective layer 26 does not need to be applied, as shown in FIG. 21A, to the surface of the phase angle recording layer 24.

A description so far has been given of an example of forming unit blocks 12, with unevenness being formed conforming to the phase angles $\phi$, by use of an original plate. As another method, a silver halide exposure material may be exposed and developed, and then bleached, followed by modifying the developed silver into a silver salt, such as silver halide, to make the material transparent. Alternatively, a thermoplastic or the like, whose refraction index or surface configuration changes due to light, may be used.

FIG. 22A is a cross-sectional view illustrating an application example of unit blocks in which unevenness conforming to phase angles is formed (in the absence of a reflective layer).

FIG. 22B is a cross-sectional view illustrating an application example of unit blocks in which unevenness conforming to phase angles is formed (in the presence of a reflective layer).

FIGS. 22A and 22B each show a configuration obtained by laminating, as necessary, a release layer 27 on a substrate 11, further laminating a phase angle recording layer 24 on the release layer 27, and further laminating an adhesive layer 28 on the phase angle recording layer 24, so as to be bonded to an object (not shown) via the adhesive layer 28.

FIGS. 22A and 22B respectively correspond to FIGS. 21A and 21B. Specifically, FIG. 22A shows a configuration example in which a reflective layer 26 is not disposed on a phase angle recording layer 24, and FIG. 22B shows a configuration example in which a reflective layer 26 is disposed on a phase angle recording layer 24.

As described above, the present modification can convert a phase angle $\phi$ into the height of unevenness of the corresponding unit block 12 of a calculated element region 16, and can form unevenness having a height corresponding to the phase angle $\phi$ in the corresponding unit block 12 of the calculated element region 16, thereby reproducing an image 17 at the reconstruction point 22. Furthermore, advantageous effects as described in the embodiment can be exerted by the present modification.

(Modification 2)

As described in the embodiment set forth above, numerical information of a phase angle is recorded in the corresponding unit block 12 of a calculated element region 16. In the present modification, the computer converts a variation of a phase angle $\phi$ into a variation in terms of a refractive index of the recording surface 14, instead of recording numerical information of the phase angle $\phi$. Furthermore, the computer converts the variation of refractive index into a void to realize the variation. Then, this void 23 is embedded, as shown in FIG. 23, for example, in the substrate 11 at a site corresponding to the unit block 12 of the calculated element region 16 to thereby record the phase angle $\phi$ into the unit block 12 of the calculated element region 16.

Figure 23:
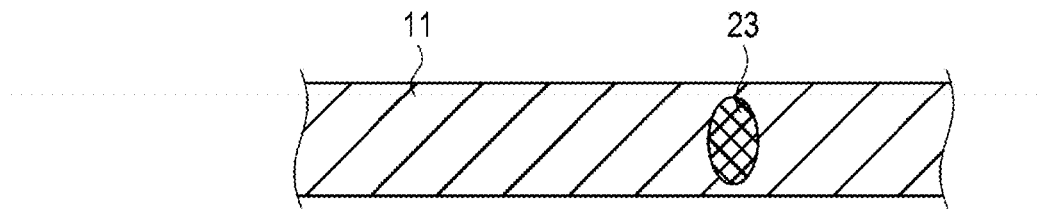
FIG. 23 is a cross-sectional view illustrating a state where a void is embedded in a substrate.

FIG. 23 is a cross-sectional view illustrating a state where a void is embedded in a substrate.

As described above, the present modification can convert variation of a phase angle $\phi$ into variation in terms of a refractive index of the recording surface 14, and can embed a void 23 for realizing the variation in the substrate 11 at a site corresponding to the unit block 12 of the calculated element region 16, thereby reproducing an image at the reconstruction points 22. Furthermore, advantageous effects as described in the embodiment can be exerted by the present modification.

Modes for implementing the present disclosure have so far been described with reference to the drawings; however, the present disclosure should not be limited to these configurations. All the alterations or modifications that a skilled person would conceive in the technical idea explicitly or implicitly shown in the present disclosure should be in the technical range of the present disclosure.

What is claimed is:

1. An optical film comprising:
a recording surface on which a plurality of unit blocks is disposed at regular intervals, wherein:
the recording surface includes a first calculated element region provided with an array of unit blocks for which phase components of light from a reconstruction point configuring a first image are calculated, and a second calculated element region provided with an array of unit blocks for which phase components of light from a reconstruction point configuring a second image are calculated;
the plurality of unit blocks comprise a first array of unit blocks in the first region of the recording surface and a second array of unit blocks in the second region of the recording surface;
the first array of unit blocks is configured to reconstruct a first image, which is a monotone image having even brightness throughout the first image in at least one monotone reconstruction point; the second array of unit blocks is configured to reconstruct a second image, which is a grayscale image having brightness gradation;
the first image is a monotone reconstruction image having even brightness, and the second image is a grayscale image having brightness gradation;
a phase component W(x, y) for each unit block of the second array has the following relationship:

$$W(kx, ky) = \sum_{n=0}^{Nmax} \sum_{kx=Ymin}^{Ymax} \sum_{kx=Xmin}^{Xmax} amp \cdot \exp(i\phi)$$

$$\phi = \frac{\pi}{\lambda \cdot O_n(z)} \{(O_n(x) - kx)^2 + (O_n(y) - ky)^2\}$$

a phase component W(x, y) for each unit block of the first array has the following relationship:

$$W(x, y) = \sum_{n=0}^{Nmax} \sum_{kx=Ymin}^{Ymax} \sum_{kx=Xmin}^{Xmax} \exp(i\phi)$$

$$\phi = \frac{\pi}{\lambda \cdot O_n(z)} \{(O_n(x) - kx)^2 + (O_n(y) - ky)^2\}$$

where W(x, y) is a phase component at a coordinate, x and y are coordinates on the recording surface, i is an imaginary number, λ is a wavelength of light at the time of reproducing the image, $O_n$(x, y, z) is a central coordinate of the unit block nearest to a coordinate of a respective reconstruction point, (kx, ky, O) is a coordinate of the unit block, ϕ is a phase angle, and amp is grayscale information, wherein the optical film comprises a substrate and a phase angle recording layer on a surface of the substrate, the phase angle recording layer forms the plurality of unit blocks two-dimensionally arrayed in the x and y directions, and the phase angle recording layer in each unit block of the plurality of unit blocks has unevenness that conforms to a respective phase component of the unit block.

2. The optical film of claim 1, wherein a number of reconstruction points reproducing the first image is different from a density of reconstruction points reproducing the second image.

3. The optical film of claim 1, wherein the recording surface contains personal authentication information.

4. The optical film of claim 1, wherein each unit block of the plurality of unit blocks has a square shape.

5. The optical film of claim 1, wherein the phase angle recording layer is a resin layer having a thickness from 0.5 µm to 5 µm.

6. The optical film of claim 5, wherein a resin forming the phase angle recording layer is a thermoplastic resin, a thermosetting resin, or a UV resin.

7. The optical film of claim 5, wherein a resin forming the phase angle recording layer is selected from the group consisting of urethane resins, polycarbonate resins, polystyrene resins, thermoplastic resins of polyvinyl chloride resins, unsaturated polyester resins, melamine resins, epoxy resins, urethane (meth)acrylate, polyester (meth)acrylate, epoxy (meth)acrylate, polyol (meth)acrylate, melamine (meth) acrylate, or triazine (meth)acrylate.

8. The optical film of claim 1, further comprising a reflective layer over a surface of the phase angle recording layer.

9. The optical film of claim 8, wherein the reflective layer is formed of an ink.

10. The optical film of claim 9, wherein the ink is an optically variable ink, a color shift ink, or a pearl ink.

11. The optical film of claim 8, wherein the reflective layer is a vapor phase deposited layer.

12. The optical film of claim 11, wherein a material of the reflective layer is an inorganic compound selected from the group consisting of $TiO_2$, $Si_2O_3$, SiO, $Fe_2O_3$ or ZnS or a metal selected from the group consisting of Al, Ag, Sn, Cr, Ni, Cu or Au.

13. The optical film of claim 8, wherein the reflective layer has a thickness of 40 nm or more and 1,000 nm or less and a reflectance of 30% or more and 70% or less.

14. The optical film of claim 1, further comprising a release layer laminated between the substrate and the phase angle recording layer.

15. The optical film of claim 14, wherein the release layer is a resin layer having a thickness from 0.1 µm to 2 µm.

16. The optical film of claim 15, wherein a resin forming the release layer is an acrylic resin, a polyester resin or a polyamide resin.

17. The optical film of claim 14, wherein the release layer is a lubricant layer having a thickness from 0.1 µm to 2 µm.

18. The optical film of claim 17, wherein a lubricant forming the release layer is a wax of polyethylene powder, a paraffin wax, silicone wax, or carnauba wax.

19. The optical film of claim 14, further comprising a reflective layer laminated on the phase angle recording layer and an adhesive layer laminated on the reflective layer.

* * * * *